No. 886,627. PATENTED MAY 5, 1908.
H. O. NEEBE.
AMUSEMENT DEVICE.
APPLICATION FILED MAR. 27, 1907.
3 SHEETS—SHEET 3.
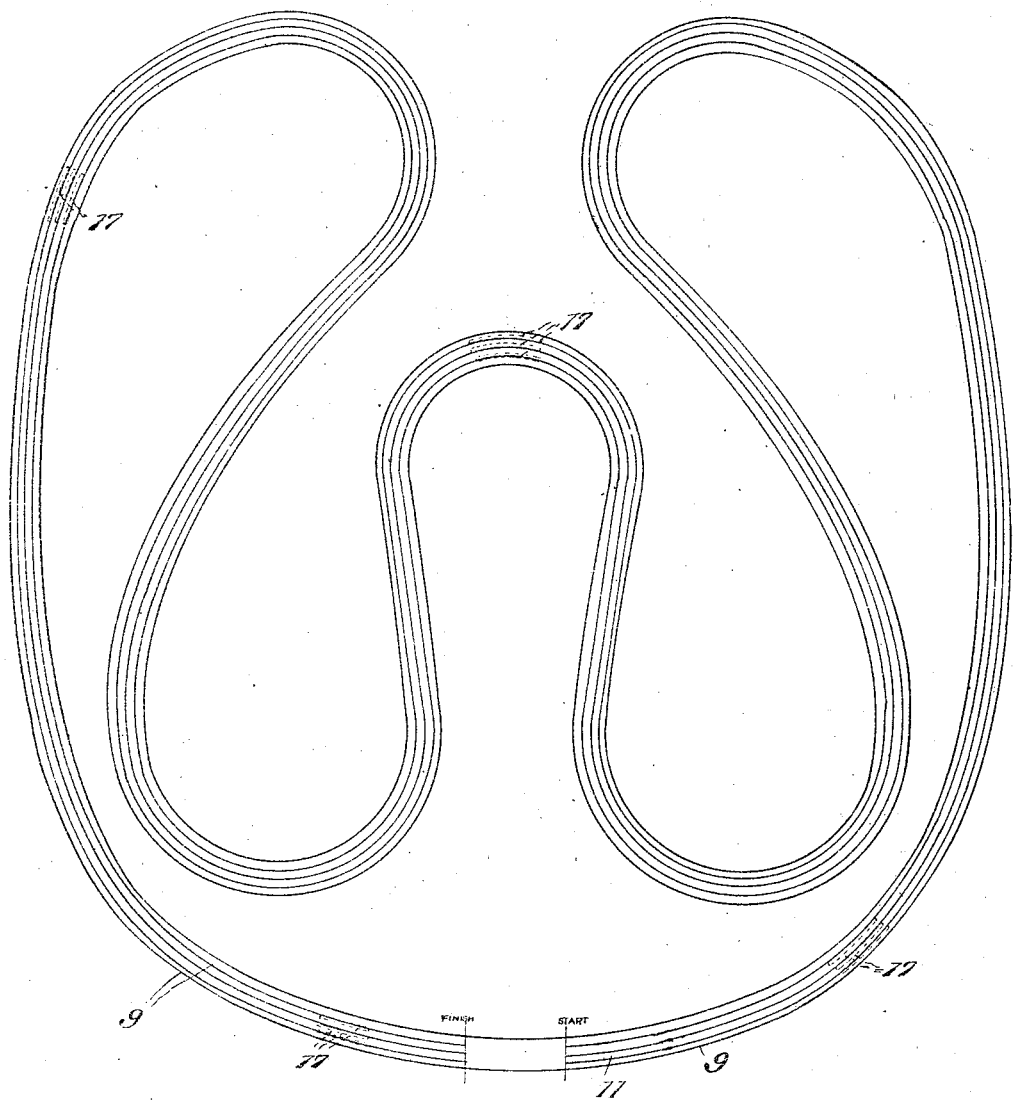
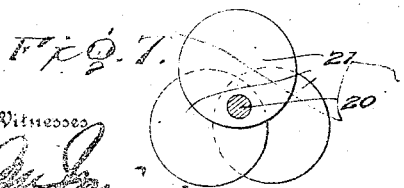
Inventor
H. O. Neebe

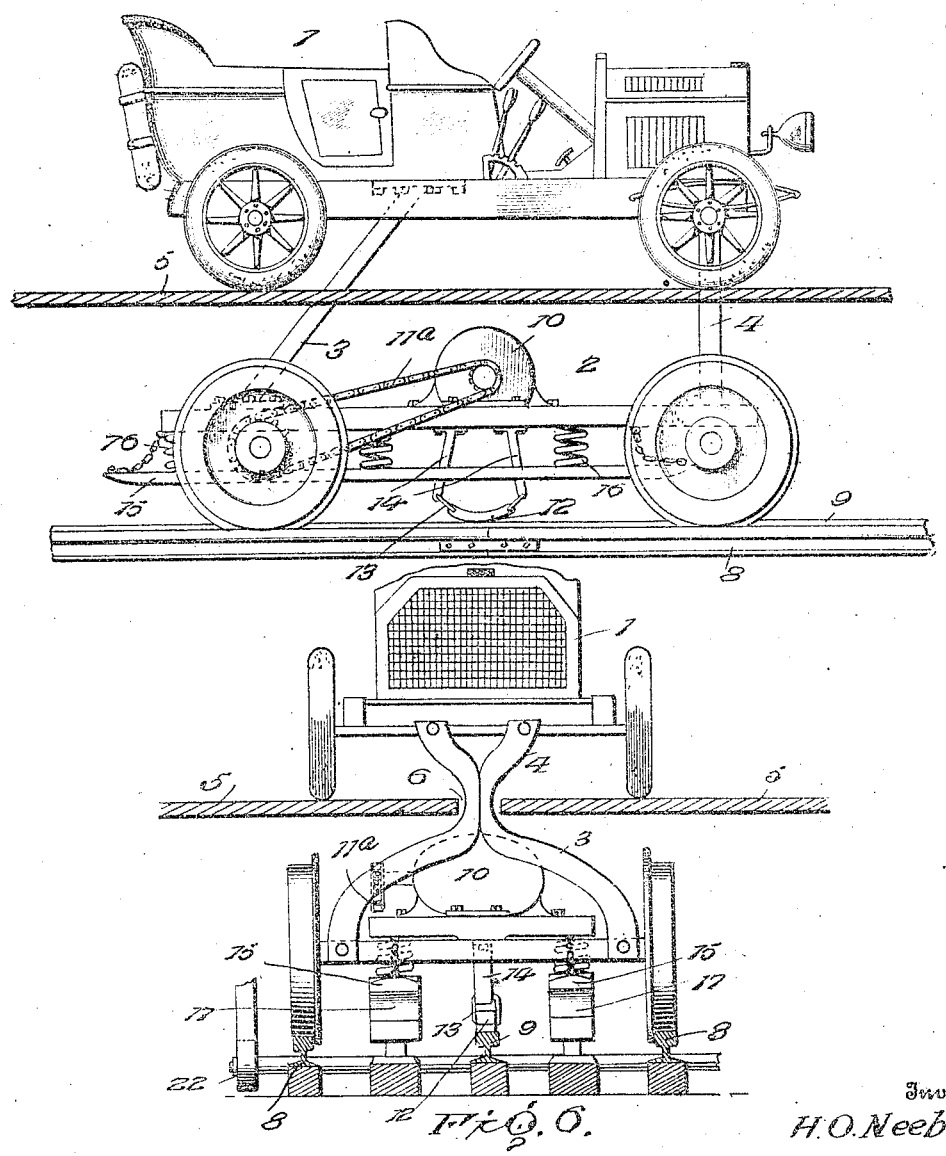

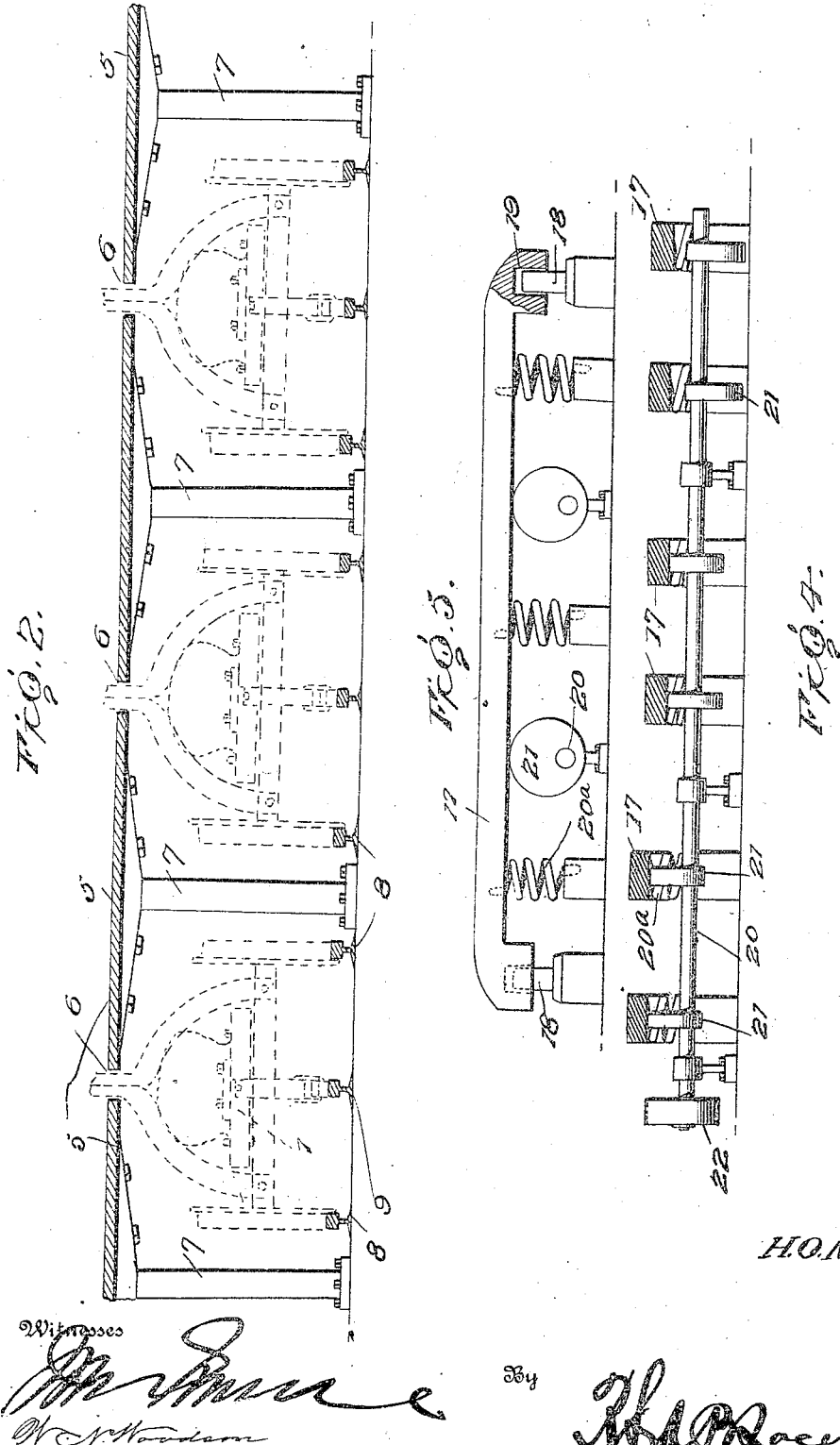

UNITED STATES PATENT OFFICE.

HENRY O. NEEBE, OF NEW YORK, N. Y.

AMUSEMENT DEVICE.

No. 886,627.  Specification of Letters Patent.  Patented May 5, 1908.

Application filed March 27, 1907. Serial No. 364,913.

*To all whom it may concern:*

Be it known that I, HENRY O. NEEBE, citizen of the United States, residing at New York, in the county of New York and State of New York, have invented certain new and useful Improvements in Amusement Devices, of which the following is a specification.

This invention relates to pleasure apparatus which besides being exhilarating is exciting since competition enters as a factor, the device being in the nature of a race, while eliminating all the dangers of a race course which admits of the racers crossing and recrossing and those on the inside having the advantage.

For a full description of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a side view of the invention. Fig. 2 is a transverse section of the race course showing a series of vehicles. Fig. 3 is a top plan view of the race course showing the reverse loops for equalizing the distance traveled by each of the vehicles. Fig. 4 is a detail view of the movable brake members and the actuating means therefor, showing the same on a larger scale. Fig. 5 is a side view of the movable brake member. Fig. 6 is a front view of the vehicle and its motor car, showing the tracks in section. Fig. 7 is a sectional view of a brake operating shaft showing the different angular positions of the eccentrics or cams.

Corresponding and like parts are referred to in the following description and indicated in all the views of the drawings by the same reference characters.

Each vehicle comprises a car 1 and a motor truck 2. The car 1 may be of any design and preferably represents an automobile with concomitant or conjunctive parts. The motor truck 2 is independent of the car and may be propelled by any mechanical force preferably by electricity. The vehicle is operated independently of the rider, being controlled from a given point, although this is not essential but is preferred as it obviates the necessity for providing an attendant for each car, thereby increasing the running expenses and at the same time reducing the carrying capacity. The motor truck is connected with the car in any convenient way as by stanchions 3 and 4, the rear stanchion being inclined, whereas the front stanchion is vertical and is forked at its upper and lower ends to make firm connection with the front axles of the car and motor truck. While the motor trucks may be conveniently arranged with reference to their respective cars, they are by preference located below the same in conduits or subways so as to be hidden from view and prevent tampering therewith.

The subways may be closed at their top side by means of plates 5, adjacent plates being spaced apart to provide slots 6 through which the stanchions 3 and 4 extend. Posts 7 support the plates 5 and are flanged at their upper and lower ends to provide for firm connection and a substantial support for the plates. Rails 8 are provided upon the bed of the subways for the motor trucks 2 to run upon. A third rail 9 is located intermediate of the track rails 8 and constitutes a conductor for conveying the electric current to the electric motors 10 of said trucks. The third rail 9 is omitted near the finish and is replaced at the start by a dead rail 11 which is adapted to be charged only when starting the vehicles to insure a like beginning. The third rail 9 is charged at all times when the device is in running or working order so that the instant the vehicles leave their respective dead rails 11, they are operated by the current derived from the third rail 9. The motor 10 is connected with the axle of the drive wheel by means of a sprocket chain 11ª or in any convenient way, said sprocket chain passing around the sprocket wheels fast to the shaft of the motor and the drive axle. The shoe 12 arranged to run upon the third rail 9 is connected at its ends by links 13 with hangers 14 pendent from the frame-work of the truck.

In order to retard the speed of the vehicles, brake devices are located at intervals in the length of the course or track, said brake devices comprising complemental parts, one of said parts being attached to the motor truck and the other to the brake. The brake member 15 fitted to each of the trucks consists of a bar having its ends beveled and pressed downward by one or more springs 16. The brake member 17 applied to the track consists likewise of a bar having opposite ends beveled and retained in place by suitable guide means as posts 18 projected upward from the bed of the track and entering openings 19 of the brake member 17. Springs 20ª normally hold the brake member 17 elevated. The frictional engagement between the brake members 15 and 17 retards the speed of the vehicles and by varying the degree of pressure, the speed of the vehicles may be checked to a greater or less extent. It is to be understood that a like number of brake members is provided for each vehicle so that there may be no undue advantage in favor of one or the other. The brake members are arranged at selected points and actuating means are provided therefor, the same consisting of a shaft 20 and pairs of eccentrics or cams 21. The cams or eccentrics 21 are arranged at different angles so that the brake members 17 are not acted upon alike or at the same time.

To equalize the strain upon opposite sides of the motor cars, a brake mechanism is arranged at each side of a medial line, hence two eccentrics or cams are necessary for each set of brake members 17 to operate both alike. The shafts 20 are rotated either by a motor 22 or in any way so as to actuate the brakes. By having the eccentrics or cams 21 differently positioned, one of the brake members 17 will be free from the influence of the eccentrics, another will be actuated upon lightly, and a third will be moved so as to exert a maximum retarding influence, i. e., to hold the brake members 17 elevated to cause a maximum frictional existence between said brake members 17 and the complemental brake members 15. The relative position of the eccentrics or cams is uncertain; hence an element of chance constitutes a factor in determining the finish. It is possible for one of the vehicles to meet with the full resistance of the brake mechanism at each point, and another vehicle to escape the retarding action of the brakes, whereas during another race, the conditions may be reversed. It is to be understood that the shafts 20 are continuously rotated and the brake members 17 not actuated upon by the eccentrics, exert but very little, if any, retarding influence upon the vehicle, whereas the brake members pressed upward by the eccentrics or cams exert a greater or less retarding influence according to the elevation of the brake member 17 determined by the position of the said eccentrics.

The track may be straight or curved according to the space, but unless the available space is limited, it is preferred to have the track continuous and comprising a series of oppositely disposed loops as indicated in Fig. 3, this arrangement equalizing the distance traveled by each vehicle so that one may not have the advantage of the other which would be the case if the track were circular, oval, or of other outline admitting of the inner half being less than the other half. The space inclosed by the several loops will be provided with scenery of any type and the same may consist of shrubbery, trees or interesting matter such as grottos and representations of mythic shrines and the like. This scenery, besides adding to the interest of the trip, also serves to conceal the track except that immediately in front of and in the rear of the vehicle.

The front stanchion 4 provides means for automatically steering the car. The plates 5 are covered with sand, gravel, asphalt or any material to represent a roadway. A short distance from the finishing line are located brake members 17 to bring the vehicles or cars to a full stop after clearing the dead rails 11. The brake members 15 are connected to the frames of the trucks by chains 23 to prevent their breaking and dragging beneath the trucks. The springs 20ª, as heretofore stated, hold the brake members 17 in normal position and draw them down after released from the eccentrics or cams 21. If desired the brake members 15 and 17 may be arranged in normal position to clear one another so as not to offer any resistance to the travel of the vehicles or cars. There will be two pairs of eccentrics or cams for each set of brake members 17 and they will be similarly arranged to move the brake members so as to run parallel to a given position at all stages of their movement. The reverse loops of the track besides equalizing the distances of travel of the vehicles result in greater capacity.

Having thus described the invention, what is claimed as new is:

1. In an amusement device, the combination of a series of tracks, a series of devices mounted to travel on the respective tracks, means for driving the devices at a uniform speed, retarding devices located in groups at intervals in the length of the tracks and of like resisting qualities, and means for operating the groups of retarding devices to bring them into play at different intervals to modify the speed of the said uniformly driven devices.

2. In an amusement device, the combination of a series of continuously driven devices propelled in the same direction at a like rate of speed and in parallel paths, groups of retarding devices arranged at intervals in the paths of the traveling devices, and means for successively bringing into play the retarding devices of each group.

3. In an amusement device, the combination of a continuous or endless series of tracks comprising reverse loops, whereby each is of like length, a series of devices mounted upon the respective tracks, means for driving the devices at a uniform speed, groups of retarding devices of like resisting qualities located at intervals in the length of the tracks, and actuating means for said retarding devices to bring those of each group into play at different intervals in rapid succession.

4. In combination with a device mounted to travel upon a track, spring pressed bars forming a retarding means for said device, one bar being mounted upon the device and another located in the length of the track, each of the bars having its ends beveled, and means for projecting the track bar into the path of the bar carried by the said device.

5. In combination, a series of tracks, a series of devices mounted to travel upon said tracks and adapted to be driven at a uniform speed, groups of bars arranged at intervals in the length of the tracks, and means for successively throwing the bars of a group into operative position, said means consisting of a shaft provided with eccentrics having different angular positions.

In testimony whereof I affix my signature in presence of two witnesses.

HENRY O. NEEBE.

Witnesses:
  M. DIEHL,
  G. A. TICEHURST.